(12) United States Patent
Finley et al.

(10) Patent No.: US 10,733,586 B2
(45) Date of Patent: *Aug. 4, 2020

(54) PAY AT PUMP ENCRYPTION DEVICE

(75) Inventors: Michael C. Finley, Roswell, GA (US);
James Fortuna, Marietta, GA (US);
James Hervey, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 545 days.

This patent is subject to a terminal disclaimer.

(21) Appl. No.: 13/116,146

(22) Filed: May 26, 2011

(65) Prior Publication Data

US 2011/0231318 A1    Sep. 22, 2011

Related U.S. Application Data

(63) Continuation of application No. 11/590,152, filed on Oct. 31, 2006, now Pat. No. 7,966,262.

(51) Int. Cl.
| | |
|---|---|
| *G06Q 20/18* | (2012.01) |
| *G07F 13/02* | (2006.01) |
| *G06Q 20/40* | (2012.01) |
| *G06Q 20/36* | (2012.01) |
| *G06Q 20/24* | (2012.01) |
| *G07F 7/10* | (2006.01) |
| *G06Q 20/38* | (2012.01) |
| *H04L 9/08* | (2006.01) |
| *H04L 9/32* | (2006.01) |

(52) U.S. Cl.
CPC ............ *G06Q 20/18* (2013.01); *G06Q 20/24* (2013.01); *G06Q 20/3674* (2013.01); *G06Q 20/382* (2013.01); *G06Q 20/3823* (2013.01); *G06Q 20/40* (2013.01); *G07F 7/1016* (2013.01); *G07F 13/025* (2013.01); *H04L 9/08* (2013.01); *H04L 9/3234* (2013.01); *H04L 2209/56* (2013.01); *H04L 2209/805* (2013.01)

(58) Field of Classification Search
CPC ...... G06Q 20/18; G06Q 20/20; G06Q 20/382; G06Q 20/3823; G06Q 20/3674; G06Q 20/24; G06Q 20/40; G07F 13/025; G07F 7/1016; H04L 9/3234; H04L 9/08; H04L 2209/805; H04L 2209/56
USPC .................... 700/231, 232, 241; 705/64, 413
See application file for complete search history.

(56) References Cited

U.S. PATENT DOCUMENTS 5,204,903 A * 4/1993 Okada .................. H04L 9/0656
380/262
5,228,084 A   7/1993 Johnson et al.
(Continued)

OTHER PUBLICATIONS

Bruce Schneier, "Applied Cryptography", 1996, John Wiley & Sons, Inc. Second Edition.*

(Continued)

*Primary Examiner* — Steven S Kim
(74) *Attorney, Agent, or Firm* — Schwegman, Lundberg & Woessner

(57) ABSTRACT

Embodiments of the present invention are drawn to systems and methods for securing information using cryptographically keyed units. Specifically, in one embodiment of the present invention, a system is provided for securing information that uses two cryptographically keyed units to encrypt information flowing between a fuel pump device and a remote device. Thus, even if the information is intercepted, it could not be used to perpetrate fraud.

8 Claims, 7 Drawing Sheets

(56) References Cited

U.S. PATENT DOCUMENTS

| | | | |
|---|---|---|---|
| 5,596,501 A | 1/1997 | Comer et al. | |
| 5,602,745 A * | 2/1997 | Atchley et al. | 705/413 |
| 5,710,814 A | 1/1998 | Klemba et al. | |
| 5,742,684 A | 4/1998 | Labaton et al. | |
| 5,745,576 A * | 4/1998 | Abraham | G06Q 20/382 |
| | | | 380/277 |
| 5,761,306 A * | 6/1998 | Lewis | G06Q 20/3829 |
| | | | 380/282 |
| 5,790,410 A * | 8/1998 | Warn et al. | 700/232 |
| 5,838,797 A * | 11/1998 | Iwasaki | H04K 1/006 |
| | | | 380/270 |
| 5,862,222 A | 1/1999 | Gunnarsson | |
| 5,892,900 A * | 4/1999 | Ginter et al. | 726/26 |
| D414,781 S * | 10/1999 | Wilson | D15/9.2 |
| 6,021,201 A | 1/2000 | Bakhle et al. | |
| 6,073,840 A * | 6/2000 | Marion | B67D 7/067 |
| | | | 235/381 |
| 6,092,629 A * | 7/2000 | Bohnert | G07F 5/18 |
| | | | 186/53 |
| 6,119,110 A | 9/2000 | Carapelli | |
| 6,185,307 B1 * | 2/2001 | Johnson, Jr. | 380/270 |
| 6,226,749 B1 * | 5/2001 | Carloganu | G06F 21/31 |
| | | | 726/2 |
| 6,296,148 B1 * | 10/2001 | Myers et al. | 222/71 |
| 6,327,578 B1 | 12/2001 | Linehan | |
| 6,360,138 B1 * | 3/2002 | Coppola | G06Q 20/341 |
| | | | 700/231 |
| 6,442,448 B1 * | 8/2002 | Finley | B67D 7/145 |
| | | | 700/231 |
| 6,778,667 B1 | 8/2004 | Bakhle et al. | |
| 7,121,460 B1 * | 10/2006 | Parsons | G06Q 20/341 |
| | | | 235/379 |
| 7,602,909 B1 * | 10/2009 | Shields | G06Q 20/341 |
| | | | 380/42 |
| 7,908,474 B2 * | 3/2011 | Arnold et al. | 713/155 |
| 7,966,262 B2 * | 6/2011 | Finley et al. | 705/64 |
| 8,100,323 B1 * | 1/2012 | Crews | G06F 21/57 |
| | | | 235/379 |
| 2002/0033417 A1 * | 3/2002 | Jeon | G07F 7/0866 |
| | | | 235/380 |
| 2003/0014372 A1 * | 1/2003 | Wheeler | G06F 21/32 |
| | | | 705/71 |
| 2003/0028285 A1 * | 2/2003 | Zura et al. | 700/241 |
| 2004/0010711 A1 * | 1/2004 | Tang | G06Q 20/02 |
| | | | 726/27 |
| 2004/0182921 A1 * | 9/2004 | Dickson et al. | 235/380 |
| 2004/0193763 A1 * | 9/2004 | Iizuka | G06F 13/385 |
| | | | 710/52 |
| 2004/0249765 A1 * | 12/2004 | Leon | G06F 21/32 |
| | | | 705/64 |
| 2005/0211766 A1 * | 9/2005 | Robertson | G06Q 20/3674 |
| | | | 235/380 |
| 2006/0044562 A1 * | 3/2006 | Hagene et al. | 356/437 |
| 2006/0064391 A1 * | 3/2006 | Petrov | G06Q 20/10 |
| | | | 705/65 |
| 2006/0085844 A1 * | 4/2006 | Buer | H04L 63/068 |
| | | | 726/4 |
| 2006/0265736 A1 * | 11/2006 | Robertson et al. | 726/3 |
| 2007/0106559 A1 * | 5/2007 | Harrell | 705/21 |
| 2008/0040287 A1 * | 2/2008 | Harrell | G06Q 20/347 |
| | | | 705/71 |

OTHER PUBLICATIONS

Abcede, Angel. "Pump Technology Expands Potential for Sales, Convenience." National Petroleum New <http://www.highbeam.com/doc/1G1-19745463.html/print>, Aug. 1, 1997, 11 pages.

Non-Final Office Action for U.S. Appl. No. 11/590,152 dated Feb. 24, 2010.

Final Office Action for U.S. Appl. No. 11/590,152 dated Aug. 24, 2010.

* cited by examiner

PAY AT PUMP ENCRYPTION DEVICE

CROSS-REFERENCE TO RELATED APPLICATIONS

This application is a continuation of U.S. application Ser. No. 11/590,152 filed Oct. 31, 2006, now U.S. Pat. No. 7,966,262 which is herein incorporated in its entirety by this reference.

BACKGROUND OF THE INVENTION

Credit card payment systems are under careful scrutiny for compliance with security measures that include protection of a consumer's credit card data. A series of requirements have been provided by the major credit card issuers (Visa, MasterCard and American Express) to retailers who want to accept cards for payment. Said retailers have in turn contacted their systems providers to request compliance in all retail systems with the guidelines known as Payment Applications Best Practices for Payment Card Industry or PABP for PCI. Components of the PABP requirements relate to the storage of credit card information and/or the security of computer networks that would grant access to said stored information, but the PABP does not address the security of credit card information as it is being transmitted between computers or devices on private (i.e., not public traffic) networks.

Stored credit card information is a likely target for those who would commit fraud, so eliminating places where information is stored and stopping access to those places are both means of fraud deterrence and prevention. However, fraudsters will likely turn to the practice of seeking credit card information as it is being transmitted from devices to computers or between computers as a means of accessing credit card information.

For communication between computers and nearby devices such as credit card readers attached to point-of-sale devices, the transmission of information can be physically secured by placing all cables and connections inside enclosures that are under supervision and cannot be tampered. A vulnerable situation arises at pay-at-pump devices, however. The existing deployed devices in many fuel pumps are not generally modern computers capable of encrypting protocols, and the connections between these devices and the nearest computers are made via long cables reaching from the consumer fueling point to the in-store point-of-sale system, for example. From the time that a card is read by a pay-at-pump device until it reaches an in-store device for processing, the card number is often transmitted in clear-text over slow and unsecured data links. While modern fuel pumps that may enable more secure transmission of this data are available, their deployment is both costly and time consuming.

A party that is intent on capturing consumer information coming from a fuel pump device currently has several options due to the numerous unsecured connections that exist at gas stations or other retail locations. For example, a fraudster could tamper with the fuel pump, gain entry into the fuel pump housing, and insert a simple recording device. The fraudster could also access the communications line at any point between the fuel pump and the in-store device, such as by gaining access to often unsupervised back-room areas where pay-at-pump wiring conduits enter the retail store.

Therefore, there is a need in the art for systems, methods, and computer program products to secure communications between fuel pump devices themselves and between fuel pump devices and remote devices such as point of sale terminals and site controllers. There is similarly a need for devices which transparently secure communication between such devices, such that existing fuel pump devices can be retrofitted instead of replaced.

SUMMARY OF THE INVENTION

The present invention provides methods, systems, and computer program products (hereinafter "method" or "methods" for convenience) for securely transmitting information.

One embodiment of the present invention provides a system for securing information using cryptographically keyed units, the system comprising: a fuel pump device; a first cryptographically keyed unit ("CKU") receiving output information from the fuel pump device over a first connection, wherein the first CKU comprises a first authentication unit for encrypting the output information; a second CKU receiving the encrypted output information from the first CKU over a second connection that is unsecured, wherein the second CKU comprises a second authentication unit that decrypts the encrypted output information; and a remote device that receives the output information from the second CKU.

Another embodiment of the present invention provides a method for securing information using cryptographically keyed units, comprising the steps of: receiving at a first cryptographically keyed unit ("CKU") output information from a fuel pump device over a first connection; encrypting the output information by the first CKU; transmitting the encrypted information from the first CKU to a second CKU over a second connection, wherein the second connection is unsecured; receiving and decrypting the encrypted information by the second CKU to produce the output information; and communicating the output information from the second CKU to a remote device.

A further embodiment of the present invention provides a method for securing information using cryptographically keyed units, comprising the steps of: receiving over a first connection at a first cryptographically keyed unit ("CKU") payment information from a fuel pump device located within a fuel pump housing, wherein the first CKU is located in an enclosure installed in the fuel pump housing; encrypting the payment information by the first CKU to create encrypted information; transmitting the encrypted information from the first CKU to a second CKU over a second connection; receiving and decrypting the encrypted information by the second CKU to produce the payment information; communicating the payment information from the second CKU to a remote device; monitoring by the first CKU one or more sensors for an indication that at least one of the fuel pump device, the fuel pump housing, or the enclosure has been tampered with, wherein a sensor is at least one of an open door sensor, motion sensor, echo-cavitation sensor, or light sensor; and disabling operation of one or more fuel pump devices upon determining by the one or more sensors that there has been tampering with at least one of the fuel pump device, the fuel pump housing, or the enclosure.

It will be apparent to those skilled in the art that various devices may be used to carry out the methods, systems, and computer program products of the present invention, including personal computers, portable computers, cryptographically keyed units, or dedicated hardware devices designed specifically to carry out embodiments of the present invention. While embodiments of the present invention may be described and claimed in a particular statutory class, such as the system statutory class, this is for convenience only and one of skill in the art will understand that each embodiment of the present invention can be described and claimed in any statutory class, including systems, apparatuses, methods, and computer program products.

Unless otherwise expressly stated, it is in no way intended that any method or embodiment set forth herein be construed as requiring that its steps be performed in a specific order. Accordingly, where a method, system, or apparatus claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

BRIEF DESCRIPTION OF THE DRAWINGS

The foregoing and other advantages and features of the invention will become more apparent from the detailed description of embodiments of the invention given below with reference to the accompanying drawings.

In the following detailed description, reference is made to the accompanying drawings, which form a part hereof, and in which is shown by way of illustration of specific embodiments in which the invention may be practiced. These embodiments are described in sufficient detail to enable those skilled in the art to practice the invention, and it is to be understood that other embodiments may be utilized, and that structural, logical and programming changes may be made without departing from the spirit and scope of the present invention.

DETAILED DESCRIPTION OF THE INVENTION

Before the present methods, systems, and computer program products are disclosed and described, it is to be understood that this invention is not limited to specific methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "an encoder" includes mixtures of encoders, reference to "an encoder" includes mixtures of two or more such encoders, and the like.

Figure 1:
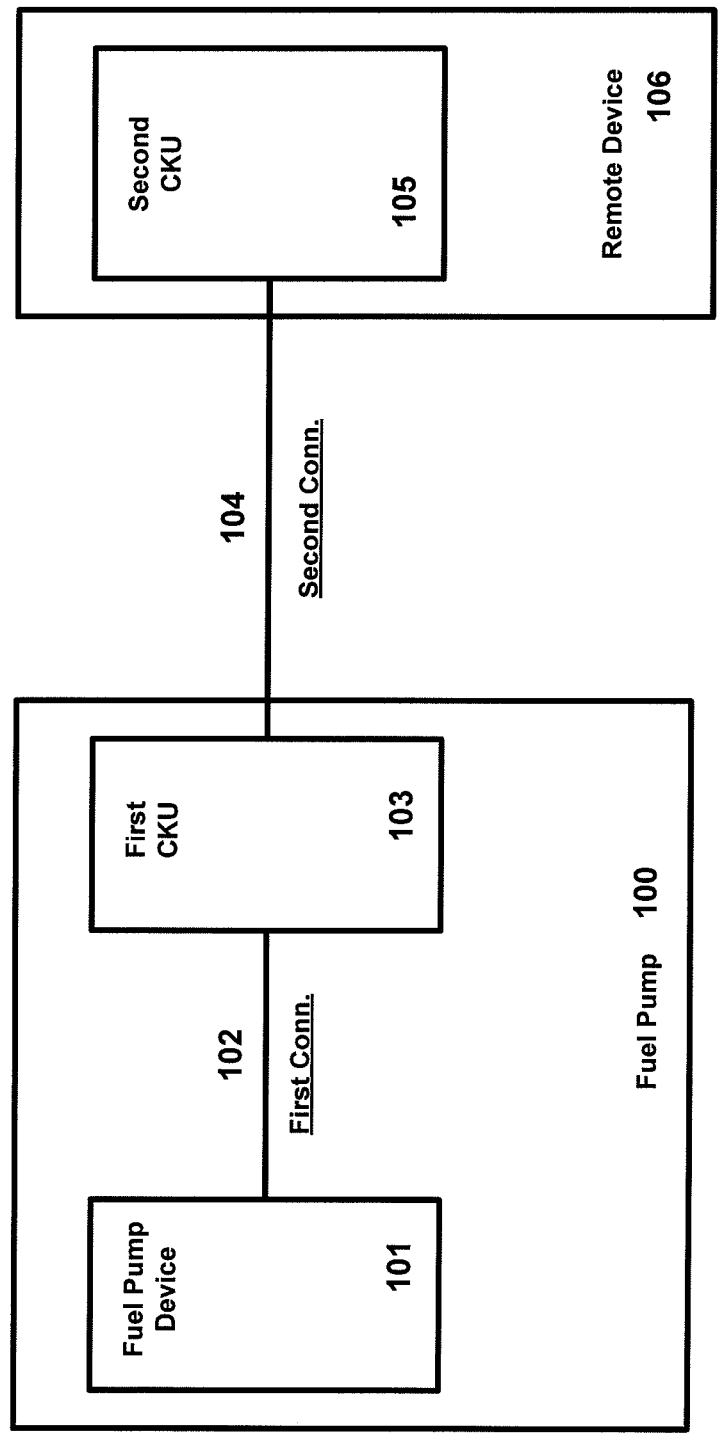
FIG. 1 illustrates a system of one embodiment of the present invention for securing information using cryptographically keyed units.

One embodiment of the present invention it illustrated in FIG. 1, and provides a system for securing information using cryptographically keyed units 103, 105.

Fuel pump 100 comprises a fuel pump device 101 and a first cryptographically keyed ("CKU") unit 103. In any embodiment of the present invention, a CKU can comprise a processor and a memory, or it can comprise one or more software modules executable on a computing device, such as the device illustrated in FIG. 2.

The first CKU 103 is connected to the fuel pump device 101 via the first connection 102. In any embodiment of the present invention, a connection, such as the first connection 102 can use one or more of a current loop, RS485, RS422, RS232, or LON communications protocol as understood by one of skill in the art. The first CKU 103 receives output information from the fuel pump device 101, such as consumer identification information, consumer payment information, or fuel pump information in various embodiments of the invention.

To prevent theft of the output information as is travels from the fuel pump 100 to the remote device 106, the first CKU 103 encrypts the output information to produce encrypted output information. Thus, even if a thief gains physical access to the second connection 104, any information intercepted will be encrypted, and hence useless to the thief.

The second CKU 105 receives the encrypted output information over the second connection 104, decrypts it, and then communicates the output information to the remote device 106. The second CKU 105 can be part of, or physically separate from, the remote device 106 in various embodiments of the present invention. In any embodiment of the present invention, the fuel pump device can be at least one of a fuel dispenser, pay-at-pump terminal, fuel controller, electronic payment controller, magnetic card reader, bar code reader, biometric reader, radio frequency reader, or smartcard reader. Further, the remote device can be at least one of another CKU, a point-of-sale terminal, a fuel pump device, or a site controller in any embodiment of the present invention. A CKU in embodiments of the present invention can comprise an authentication unit for encrypting and decrypting output data. The authentication unit can comprise a secure authentication module ("SAM") as understood by one of skill in the art.

Figure 2:
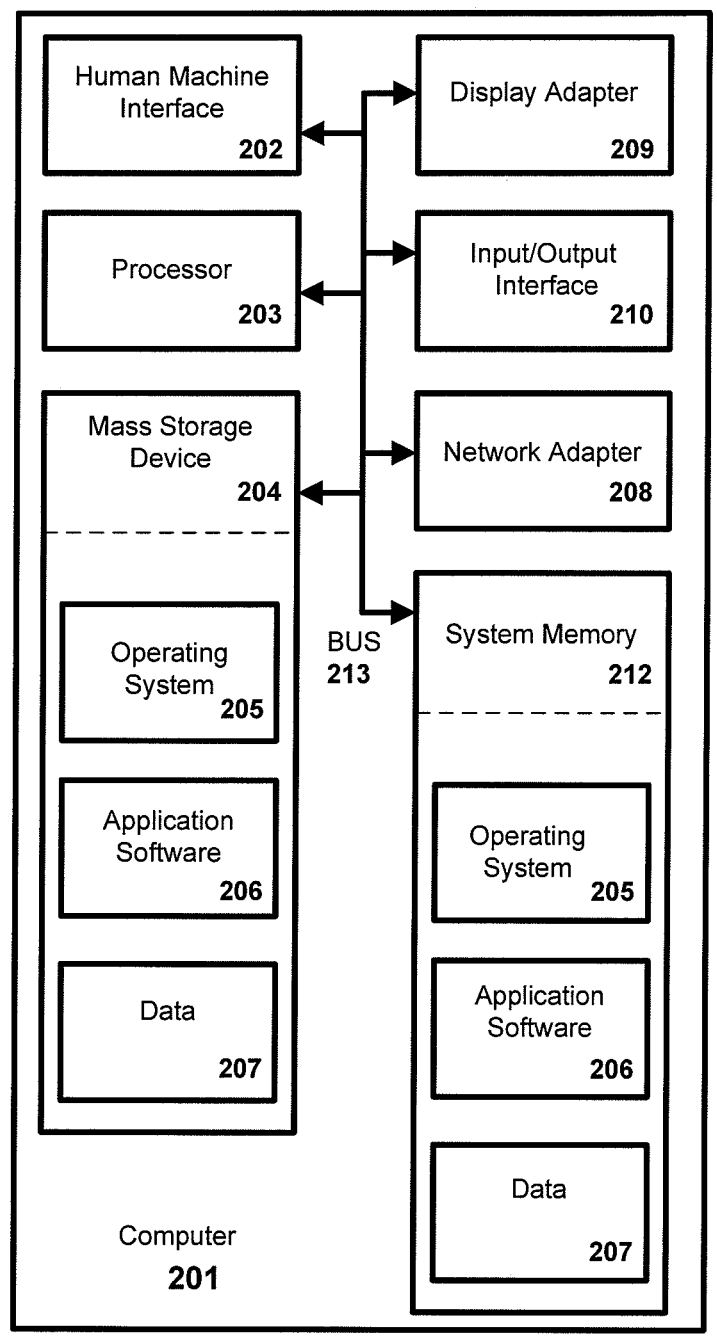
FIG. 2 shows a logical overview of a computer system which may be used with various embodiments of the present invention.

A point-of-sale terminal or site controller can comprise a general purpose computer 201 as illustrated in FIG. 2. The components of the computer 201 can include, but are not limited to, one or more processors or processing units 203, a system memory 212, and a system bus 213 that couples various system components including the processor 203 to the system memory 212.

The processor 203 in FIG. 2 can be an x-86 compatible processor, including a PENTIUM IV, manufactured by Intel Corporation, or an ATHLON 64 processor, manufactured by Advanced Micro Devices Corporation. Processors utilizing other instruction sets may also be used, including those manufactured by Apple, IBM, or NEC. For example, the processor 203 can be an XSCALE processor.

The system bus 213 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 213, and all buses specified in this description can also be implemented over a wired or wireless network connection and each of the subsystems, including the processor 203, a mass storage device 204, an operating system 205, application software 206, data 207, a network adapter 208, system memory 212, an Input/Output Interface 210, a display adapter 209, a display device 211, and a human machine interface 202, can be contained within one or more remote computing devices at physically separate locations, connected through buses of this form, in effect implementing a fully distributed system.

The operating system 205 in FIG. 2 includes operating systems such as MICROSOFT WINDOWS XP, WINDOWS CE, WINDOWS 2000, WINDOWS NT, or WINDOWS 98, and REDHAT LINUX, FREE BSD, or SUN MICROSYSTEMS SOLARIS. Additionally, the application software 206 may include web browsing software, such as MICROSOFT INTERNET EXPLORER or MOZILLA FIREFOX, enabling a user to view HTML, SGML, XML, or any other suitably constructed document language on the display device 211.

The computer 201 typically includes a variety of computer readable media. Such media can be any available media that is accessible by the computer 201 and includes both volatile and non-volatile media, removable and non-removable media. The system memory 212 includes computer readable media in the form of volatile memory, such as random access memory (RAM), and/or non-volatile memory, such as read only memory (ROM). The system memory 212 typically contains data such as data 207 and/or program modules such as operating system 205 and application software 206 that are immediately accessible to and/or are presently operated on by the processing unit 203.

The computer 201 may also include other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example, a mass storage device 204 can be a hard disk, a removable magnetic disk, a removable optical disk, magnetic cassette, magnetic storage device, flash memory device, CD-ROM, digital versatile disk (DVD) or other optical storage, random access memories (RAM), read only memories (ROM), solid state storage units, electrically erasable programmable read-only memory (EEPROM), and the like.

Any number of program modules can be stored on the mass storage device 204, including by way of example, an operating system 205 and application software 206. Each of the operating system 205 and application software 206 (or some combination thereof) may include elements of the programming and the application software 206. Data 207 can also be stored on the mass storage device 204. Data 204 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 201 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 203 via a human machine interface 202 that is coupled to the system bus 213, but may be connected by other interface and bus structures, such as a parallel port, serial port, game port, or a universal serial bus (USB).

A display device 211 can also be connected to the system bus 213 via an interface, such as a display adapter 209. For example, a display device can be a cathode ray tube (CRT) monitor, a Liquid Crystal Display (LCD), or a television. In addition to the display device 211, other output peripheral devices can include components such as speakers (not shown) and a printer (not shown) which can be connected to the computer 201 via Input/Output Interface 210. The Input/Output Interface 210 can include an interface for connecting to devices which communication over serial, parallel, or legacy connections such current loop, RS485, RS422, RS232, or LON.

The computer 201 can operate in a networked environment using logical connections to one or more remote computing devices. By way of example, a remote computing device can be a personal computer, portable computer, a server, a router, a set top box, a network computer, a peer device or other common network node, and so on. Logical connections between the computer 201 and a remote computing device can be made via a local area network (LAN) and a general wide area network (WAN). Such network connections can be through a network adapter 208. A network adapter 208 can be implemented in both wired and wireless environments. Such networking environments are commonplace in offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of application software 206 may be stored on or transmitted across some form of computer readable media. An implementation of the disclosed methods may also be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state devices, or any other medium which can be used to store the desired information and which can be accessed by a computer.

Returning to the embodiment of FIG. 1, the system can further comprise a fuel pump housing that contains the fuel pump device 101 and the first CKU 103. In further embodiments based on the embodiment of FIG. 1, the system further comprises one or more tamper sensors coupled to the first CKU 103. Tamper sensors are useful to detect and deter tampering with the fuel pump 100, fuel pump housing, fuel pump device 101, or the first CKU 103. For example, one or more fuel pump devices, such as the fuel pump device 101, can be disabled when one or more of the tamper sensors are triggered, preventing a thief from capturing the output information. A sensor in various embodiments of the present invention can be one or more of a door sensor, motion sensor, light sensor, echo-cavitation sensor, or any sensor useful to detect tampering. The memory of a CKU can further be used to log sensor information in various embodiments of the present invention. Logging sensor information can be useful, for example, to conduct post-tamper analysis of a fuel pump.

To provide further security, a CKU can be contained within an enclosure in any embodiment of the present invention. For example, in an embodiment based on the embodiment of FIG. 1, the first CKU 103 can be contained within an enclosure located within the fuel pump housing. The CKU enclosure it useful, for example, to further prevent and deter tampering.

Figure 3:
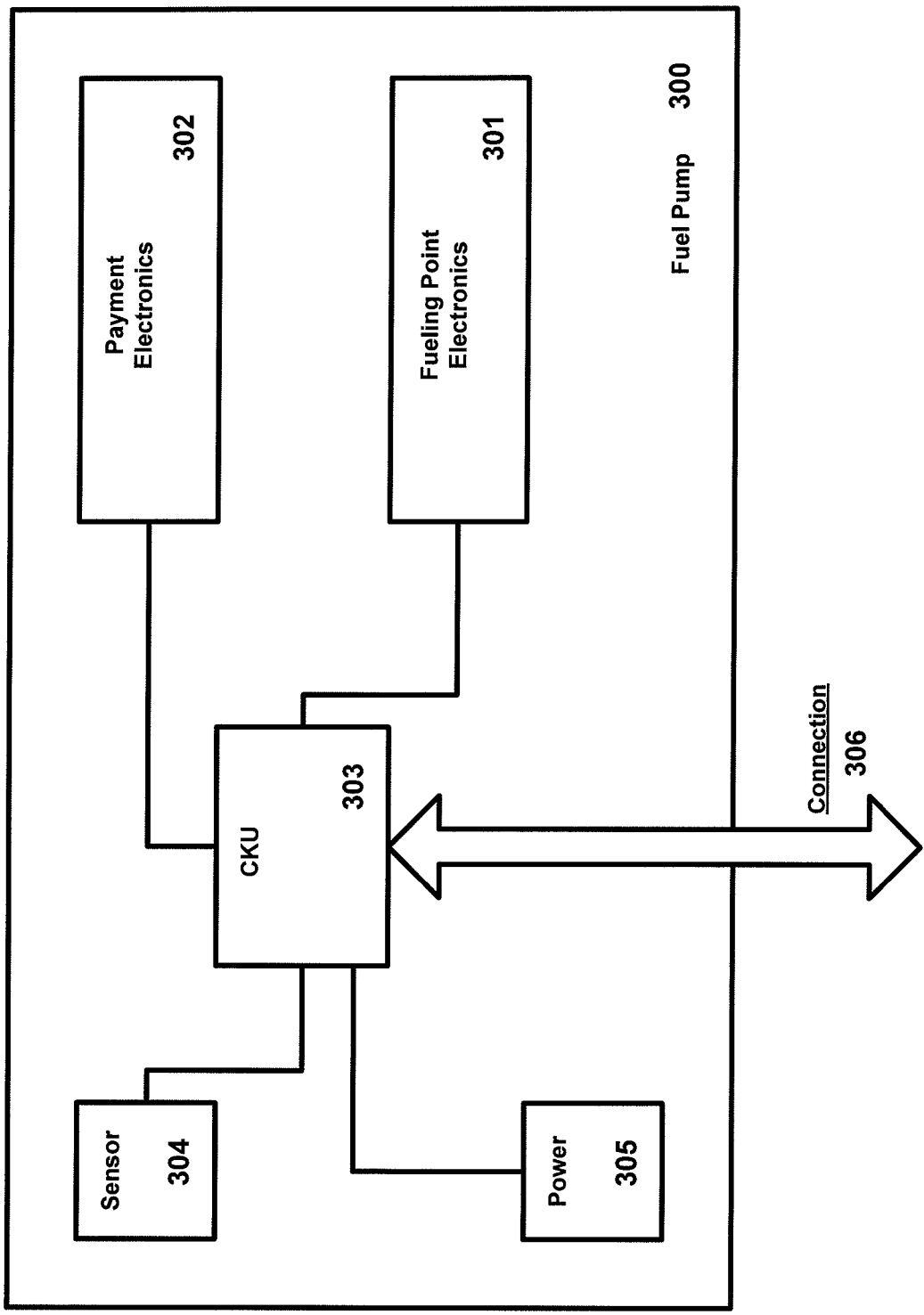
FIG. 3 illustrates the components of a fuel pump useable with embodiments of the present invention.

One embodiment of the present invention useable with a fuel pump is provided in FIG. 3. In FIG. 3, the fuel pump 300 comprises fueling point electronics 301 and payment electronics 302. The fueling point electronics 301 and the payment electronics 302 are connected to a CKU 303. One or more sensors 304 are attached to the CKU, with the sensors 304 useful to deter and detect tampering with the fuel pump 300. A power supply 305 is also present that is used to provide power to the CKU 303. The power supply 305 can supply power drawn directly from the fuel pump 300 power supply, or can comprise one or more batteries. The CKU 303 receives information from the fueling point electronics 301 and the payment electronics 302.

In the current embodiment, the CKU 303 is connected to a remote device over the connection 306, where the remote device can be at least one of another CKU, a point-of-sale terminal, a fuel pump device, or a site controller. The connection 306 can comprise least one of a current loop, RS485, RS422, RS232, or LON communications protocol.

To secure the information produced by the fueling point electronics 301 and the payment electronics 302, the CKU 303 encrypts information received from the fueling point electronics 301 and the payment electronics 302 to produce encrypted output information. The encrypted output information can then be transmitted over the connection 306 to a remote device. Thus, if a thief intercepts information being transmitted over the connection 306, it will be encrypted and unintelligible to the thief.

Figure 4:
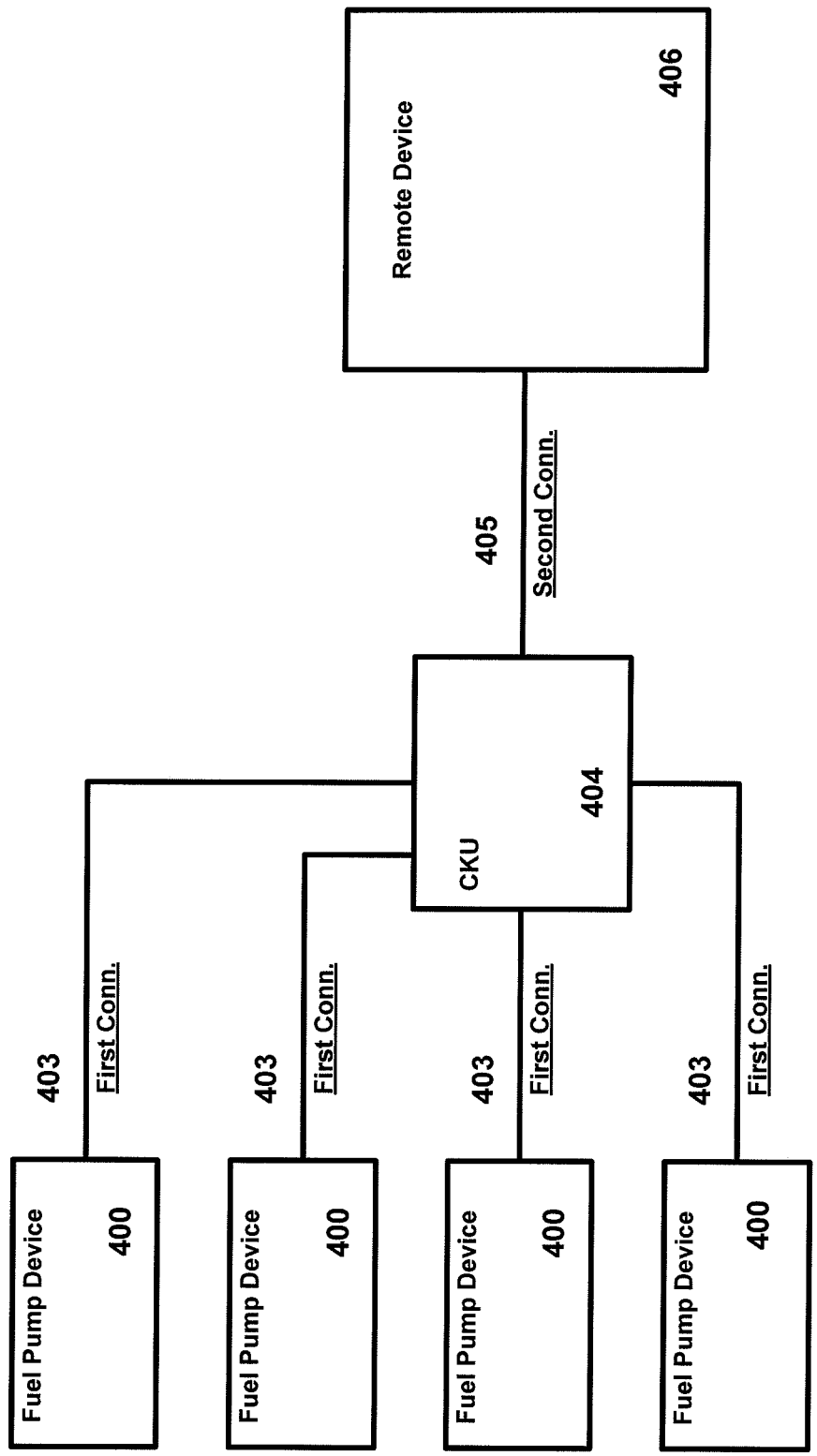
FIG. 4 illustrates one embodiment of the present invention for securing information from a plurality of fuel pump devices.

Another embodiment of the present invention is depicted in FIG. 4. In FIG. 4, a plurality of fuel pump devices 400 are connected to a CKU 404. As understood by one of skill in the art, the first connections 403 can be separate physical connections or can comprise one physical connection that carries information from the plurality of fuel pump devices 400. The CKU 404 can then combine the information received from the plurality of fuel pump devices 400 to create output information. The output information can then be encrypted by the CKU 404 and transmitted to a remote device 406 over a second connection 405. The fuel pump devices 400 can be installed in a single fuel pump, or they can be installed in different fuel pumps. Thus, a single CKU 404 can provide an encrypting interconnection means for a plurality of fuel pump devices 400. Information received by the CKU 404 from the plurality of fuel pump devices 400 can be combined into output information using any suitable means. For example, the CKU 404 can combine received information in any embodiment of the present invention using a multiplexer as understood by one of skill in the art.

Figure 5:
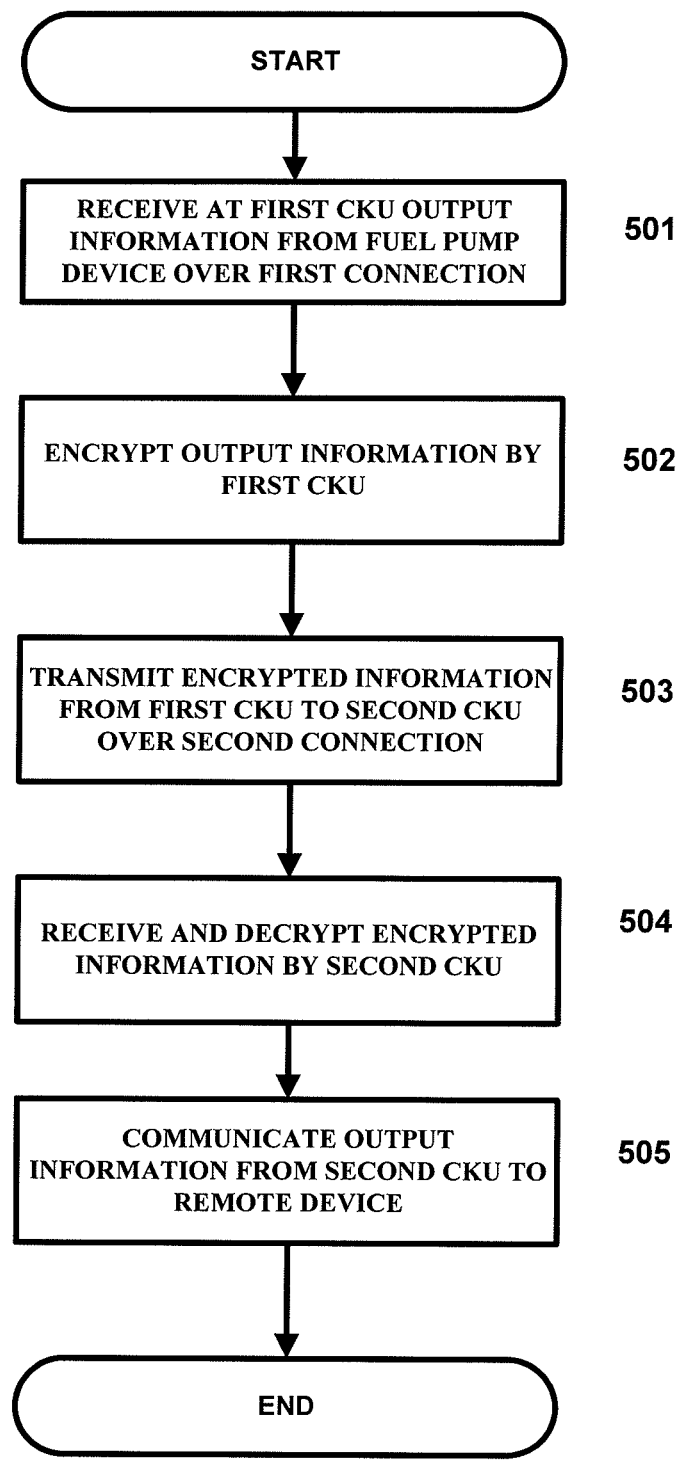
FIG. 5 illustrates a method of one embodiment of the present invention for securing information using CKUs.

FIG. 5 illustrates one embodiment of the present invention that provides a method for securing information using cryptographically keyed units. First in the embodiment of FIG. 5, output information is received 501 at a first CKU from a fuel pump device over a first connection. Second, the first CKU encrypts the output information 502. The encrypted information is then transmitted 503 from the first CKU to a second CKU over a second connection, which may be unsecured. The second CKU then receives 504 the encrypted information and decrypts it to produce the output information. Finally, the output information is communicated from the second CKU to a remote device.

In one embodiment extending the embodiment of FIG. 5, the first CKU receives information from a plurality of fuel pump devices over at least a first connection, and then the received information is combined to create the output information. The information can be combined, for example, by multiplexing the information received from the plurality of fuel pump devices. The first connection and the second connection can each use at least one of a current loop, RS485, RS422, RS232, or LON communications protocol in embodiments extending FIG. 5. The fuel pump device can be at least one of a fuel dispenser, pay-at-pump terminal, fuel controller, electronic payment controller, magnetic card reader, bar code reader, biometric reader, radio frequency reader, or smartcard reader in various embodiments of the present invention. A symmetric or asymmetric encryption algorithm can be used with the embodiment of FIG. 5, or with any embodiment of the present invention.

In any embodiment of the present invention, such as in the embodiment of FIG. 5, the output information can comprise at least one of consumer payment information or consumer identity information. Further, the first CKU can be installed in a fuel pump housing that contains the fuel pump device, and the first CKU can comprise a processor and a memory.

The first CKU can monitor one or more sensors for an indication that there has been tampering with at least one of the fuel pump device or the fuel pump housing in any embodiment of the present invention. A sensor can be at least one of an open door sensor, motion sensor, echo-cavitation sensor, or light sensor. Further, at least one of the one or more sensors may determine that at least one of the fuel pump device or the fuel pump housing has been tampered with, causing the first CKU to send a message to the second CKU that tampering has occurred. In a further embodiment, one or more fuel pump devices may be selectively disabled until a command is received to resume operation. For example, in one embodiment of the present invention based on the embodiment of FIG. 5, electronic payment equipment located at the pump may be disabled upon triggering of a sensor, preventing theft of payment information. However, the fueling electronics enabling pump operation may continue to operate, so that cash transactions are still supported. Thus, one or more fuel pump devices can be selectively disabled based on one or more sensors in various embodiments of the present invention.

Sensor information can be logged in embodiments of the present invention. For example, extending the embodiment of FIG. 5, information from one or more sensors can be logged in a memory of the first CKU.

Figure 6:
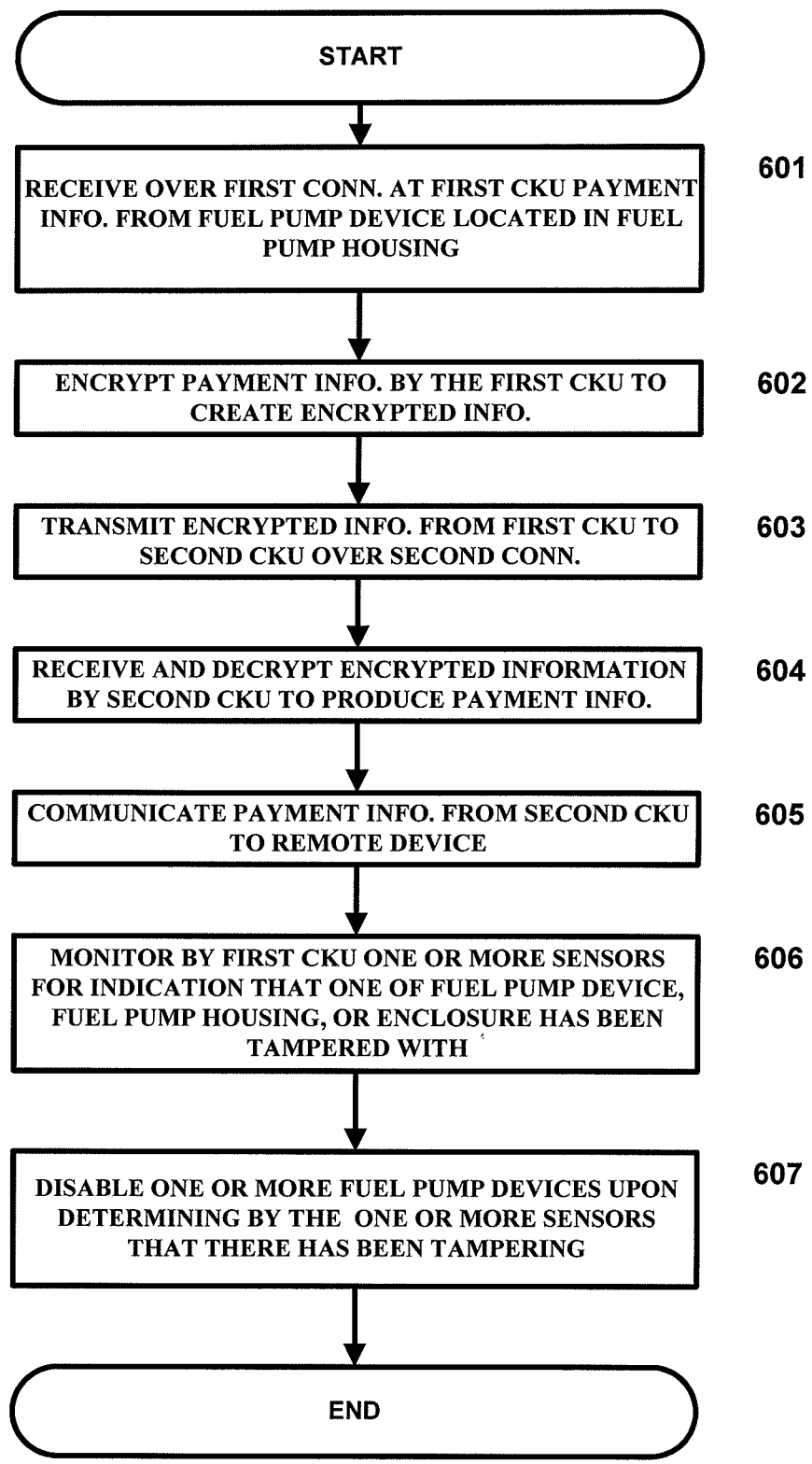
FIG. 6 illustrates another method of one embodiment of the present invention for securing information using CKUs.

Another method for securing information using cryptographically keyed units is illustrated in FIG. 6. First, a first CKU receives 601 over a first connection payment information from a fuel pump device located in a fuel pump housing, where the first CKU is located in an enclosure in the fuel pump housing. Second, the payment information is encrypted 602 by the first CKU to create encrypted information. The encrypted information is then transmitted 603 from the first CKU to a second CKU over a second connection, and the second CKU receives 604 and decrypts the encrypted information to produce the payment information. Fifth, the payment information is communicated 605 from the second CKU to a remote device.

Next in the embodiment of FIG. 6, the first CKU monitors 606 one or more sensors for an indication that at least one of the fuel pump device, the fuel pump housing, or the enclosure has been tampered with, wherein a sensor can be at least one of an open door sensor, motion sensor, echo-cavitation sensor, or light sensor. Finally, operation of one or more fuel pump devices is disabled 607 upon determining by the one or more sensors that there has been tampering with at least one of the fuel pump device, the fuel pump housing, or the enclosure.

The first connection and the second connection can each use at least one of a current loop, RS485, RS422, RS232, or LON communications protocol in embodiments extending FIG. 6. Also, the fuel pump device can be at least one of a fuel dispenser, pay-at-pump terminal, fuel controller, electronic payment controller, magnetic card reader, bar code reader, biometric reader, radio frequency reader, or smart-card reader in embodiments based on the embodiment of FIG. 6. Sensor information can also be logged in further embodiments based on FIG. 6.

Figure 7:
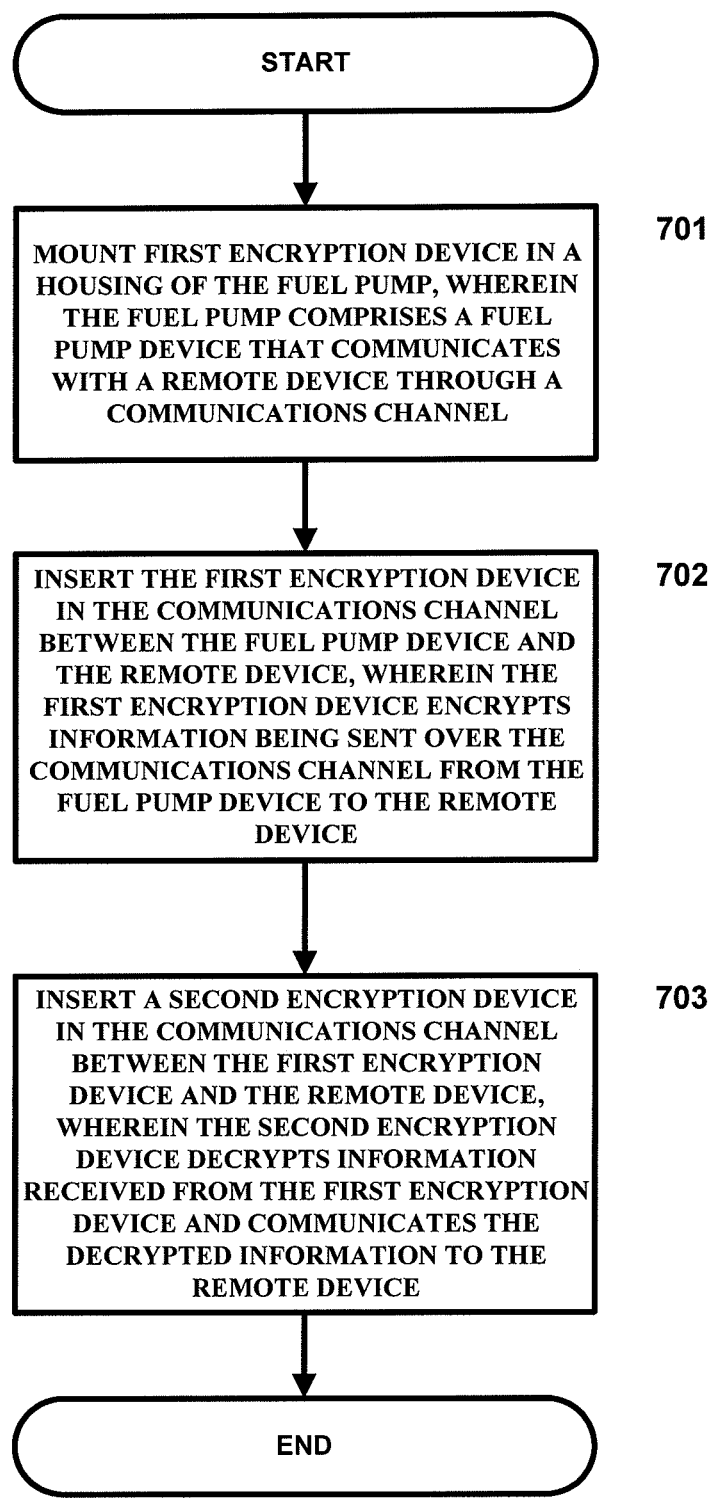
FIG. 7 illustrates one method of one embodiment of the present invention for retrofitting a fuel pump to provide for secure communications.

A method for retrofitting a fuel pump to provide for secure communications is illustrated in FIG. 7. First, a first encryption device is mounted 701 in a housing of the fuel pump, wherein the fuel pump comprises a fuel pump device that communicates with a remote device through a communications channel. An encryption device in the embodiment of FIG. 7 can comprise a CKU as described herein. Second, the first encryption device is inserted 702 in the communications channel between the fuel pump device and the remote device, wherein the first encryption device encrypts information being sent over the communications channel from the fuel pump device to the remote device. Finally, a second encryption device is inserted 703 in the communications channel between the first encryption device and the remote device, wherein the second encryption device decrypts information received from the first encryption device and communicates the decrypted information to the remove device. Thus, the embodiment of FIG. 7 provides a method for providing secure communications between a fuel pump device and a remote device without the costs, delays, and difficulties involved in replacing existing fuel pump devices and remote devices.

In one embodiment of the present invention extending the embodiment of FIG. 7, a tamper sensor is installed within the fuel pump housing. The tamper sensor is then connected to the first encryption device so that the tamper sensor can be monitored. The tamper sensor can comprise at least one of an open door sensor, motion sensor, light sensor, echo-cavitation sensor, or any sensor suitable to detect tampering. Further, the first encryption device can be configured to disable one or more fuel pump devices upon receiving an indication from the sensor that there has been tampering. More than one tamper sensor can also be used in embodiments of the present invention.

While the present invention has been described in detail in connection with various embodiments, it should be understood that the present invention is not limited to the above-disclosed embodiments. Rather, the invention can be modified to incorporate any number of variations, alternations, substitutions, or equivalent arrangements not heretofore described, but which are commensurate with the spirit and scope of the invention.

We claim:
1. A system, comprising:
a fuel pump comprising:
   a fuel pump housing, a tamper sensor, a fuel pump device, and a first cryptographically keyed unit ("CKU"), the fuel pump housing encloses or houses: the tamper sensor, the fuel pump device, and the first CKU;
   a remote device comprising a second CKU, wherein the remote device is external and remote from the fuel pump;
   a first connection comprising a physical wired bus connection between the fuel pump device and the first CKU; and
   a second connection comprising an unsecured connection between the first CKU and the second CKU;
wherein the first CKU comprising a first processor;
wherein the first processor of the first CKU comprising a secure authentication module circuit, and the first processor programmed to: receive consumer information input into the fuel pump device over the first connection as payment information and encrypt the consumer information using the secure authentication module circuit yielding encrypted consumer information;
wherein the second CKU comprising a second processor;
wherein the second processor of the second CKU programmed to: receive the encrypted consumer information from the first CKU over the second connection, decrypt the encrypted consumer information yielding output information, and provide the output information to the remote device for payment processing;
wherein the tamper sensor comprising at least one of an open door sensor, a motion sensor, a light sensor, and an echo-cavitation sensor, wherein the tamper sensor is configured to detect tampering with the fuel pump, the fuel pump housing, the fuel pump device, or the first CKU, wherein the tamper sensor is further configured to generate and trigger sensor information upon tampering;
wherein the fuel pump device is configured to be disabled when the sensor information is triggered from the tamper sensor.

2. The system of claim 1, wherein the first connection and the second connection each use at least one of a current loop, RS485, RS422, RS232, or LON communications protocol.

3. The system of claim 1, wherein the remote device is at least one of another CKU, a point-of-sale terminal, a fuel pump device, or a site controller.

4. The system of claim 1, wherein the first CKU further comprises a memory.

5. The system of claim 4, wherein the memory retains a log comprising the sensor information from said tamper sensor.

6. The system of claim 1, wherein the output information comprises at least one of consumer payment information or consumer identify information.

7. The system of claim 1, wherein the first processor and the second processor utilize one of a symmetric encryption algorithm or an asymmetric encryption algorithm.

8. The system of claim 1, further comprising an enclosure that contains the first CKU, wherein the enclosure is located within the fuel pump housing.

\* \* \* \* \*